L. F. BRITSCH.
PROCESS OF SOLDERING LINKS OF CHAINS.
APPLICATION FILED APR. 25, 1912.

1,060,062. Patented Apr. 29, 1913.

Witnesses:

Inventor:

UNITED STATES PATENT OFFICE.

LOUIS FRIEDRICH BRITSCH, OF PFORZHEIM, GERMANY.

PROCESS OF SOLDERING LINKS OF CHAINS.

1,060,062. Specification of Letters Patent. Patented Apr. 29, 1913.

Application filed April 25, 1912. Serial No. 693,241.

*To all whom it may concern:*

Be it known that I, LOUIS FRIEDRICH BRITSCH, a subject of the German Emperor, and resident of Pforzheim, Germany, have invented certain new and useful Improvements in Processes of Soldering Links of Chains, of which the following is a specification.

Various known processes have for their object to prevent chains from becoming stiff, which often occurs when soldering the single links of chains made from solder-cored wire owing to the solder overflowing at the hanging point between two links. To attain the intended object, it has been proposed to provide the chains before soldering with a solder-resisting coating which allows the solder to stick to the joints of the single links only, or the freshly soldered links were by a shaking device or the like shaken until the solder lost by cooling its tendency to stick to the adjacent links. The first-mentioned process is not only very time-wasting and thus expensive, but it is also not very reliable, as sometimes portions of the solder-resisting material pass into the joints and thus prevent same from being soldered. The second-mentioned process meets the requirements in a better way, but it is faulty inasmuch as by the vigorous shaking the liquid solder is thrown out of the joint and settles then easily on the surface of the link, whereby the latter becomes bad-looking, while at the same time the joint is not filled out.

The present invention provides a process which is based on the principle that the intended object cannot be attained unless the heating is not further proceeded with, than is necessary for the solder flowing over the cut faces of the joint and unless the chain links continuously change their positions relatively to each other as long as the solder is in liquid condition in order that the hardening moment of the solder will not coincide with an instant at which two links persist in their position, even if it be for the fraction of a second only. For, on such coincidence the effect of soldering and thus the stiffening of the chain is based. Said movement of the single links relatively to each other must, however, be as quiet as possible and free of shocks, in order not to drive the solder out of the joint.

Figure 1:
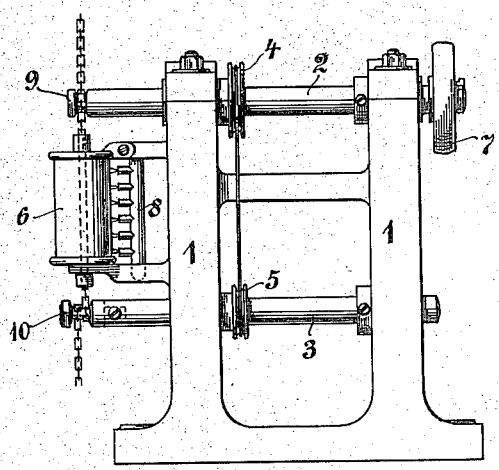
Figure 2:
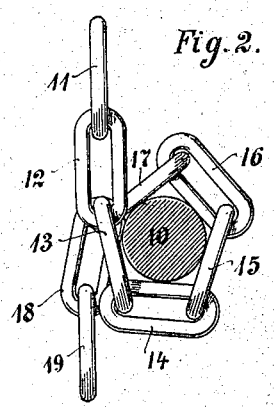
Figure 3:
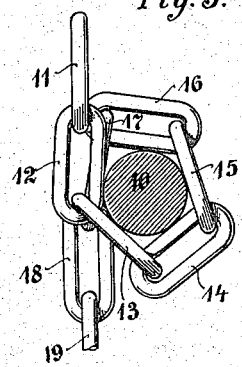
Figure 4:
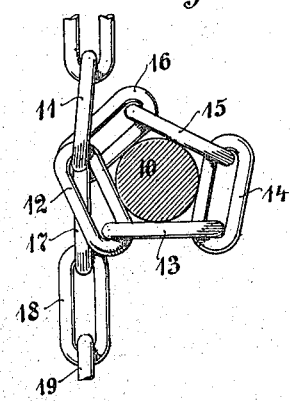
Figure 5:
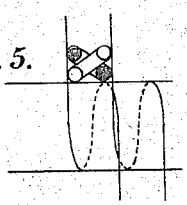

An apparatus, such as preferably used for putting the improved process into practice, is shown on the accompanying drawing in Figure 1 in a front view, while Figs. 2 to 4 show the successive positions assumed by the chain links during the process, and Fig. 5 demonstrates diagrammatically the lateral change of direction of the single chain links.

In the frame 1 an upper shaft 2 and a lower shaft 3 are revolubly mounted, both shafts being fitted with interchangeable cord pulleys 4 and 5, which communicate with each other by a cord. The shafts are driven from a pulley 7 arranged on one end of the upper shaft. Both shafts project at their other ends beyond the frame and carry there specially designed and grooved heads of such kind, that the chain arriving from up above is conveyed through the upper head 9 at a small angle, while it is wound around the lower head 10 in a loop-like manner. The lower head 10 is interchangeable, as its shape must be adapted to any form and size of the chain profile and the speed of the change of position of the chain links depends on its diameter. The vertically arranged heating body 6 is heated electrically or by blast gas flames issuing from pipe 8 in such a way that the heating degree can be regulated. A socket at the top and bottom of the heating body leads the chain centrally through the latter, the connection-line between the grooves of both heads 9 and 10 being coincident with the center-line of the heating body. The entangled chain, which rests somewhat on the head 9, is by the revolution of the latter conveyed by friction to the heating body 6 and passes through the latter, where the solder becomes fluid, whereupon the chain is continuously wound around and again unwound from the lower head 10, which rotates a little quicker than the upper head 9. In order to effect, upon the revolution of the head, a permanent change of the angle inclosed by two succeeding links, it is necessary that the diameter of the head be rather small in respect to the length of the link. Otherwise, the single links would put themselves around the head like the sides of a circumscribed polygon and persist in their position relatively to each other during their rotation around the same. Only on the transit from the vertical into the wound-up position, and, vice versa, upon the unwinding from the head 10 into the vertical position, would alterations of the angular position take place. Here, however, another result is obtained in that the forces acting on the up and down running links are very unequal and, owing to the small number of links between them, their influence is maintained on the whole circumference. First, it is obvious that the long chain hanging below the head 10 must by its weight exert a pull on the descending link 18 (Fig. 2), which is larger than the pull produced by the rotation of the head on the link 13 arriving from up above. For, first the rotation of the upper head 9 pulls the chain permanently downward and then the smooth groove of head 10 has no point of attack and no essential friction in order to act in the sense of a pull on the link 13. The links will, therefore, follow the pulling force of the chain weight the more, the nearer they arrive at the descending point. This results in continuous displacements and changes of position, which are hereinafter explained. Previously, however, another point must be considered: It can be assumed that the chain links run over the head 10 either in such a way that alternately one link is placed on edge and another one flat (Figs. 2 and 4), or that the same assume such an oblique position that all links touch the head with one side only (Fig. 5). The result of the process is, however, not influenced thereby, as for exactly the same distance that the links, which are placed on edge, are approached to the head, the others are removed therefrom, and even a rotary movement of the links on the longitudinal axis, upon their winding and unwinding, would be of little consequence.

In Fig. 2, the link 12 in vertical position touches just the head. Links 13 and 12 form between them an angle which does not depart much from 180°, while link 14 forms with the adjacent links 13 and 15 about equal angles. In Fig. 3, another position is shown: Link 12 has arrived from the vertical position into an inclined one to the left, but at the same time the angle between links 12 and 13 is considerably reduced. The angles formed by link 14 with the links 13 and 15, have become unequal, the latter larger than the former, in consequence of the stronger pull on the side of link 15. In Fig. 4, the previously vertical link 11 has received an inclination to the left; link 12, previously inclined to the left, has now accomplished a strong turn to the right, its angle with link 13 has become smaller and also the angles of link 14 with links 13 and 15 have been changed in that their difference, which was considerable in Fig. 3, has become smaller. In Fig. 2, the angle 15—16 is larger than that 15—14, in Fig. 3 the same appear little different, in Fig. 4 is 15—16 again somewhat larger than 15—14. Angle 16—15 is in Fig. 2 somewhat smaller than in Fig. 3, which can be recognized by the fact that in Fig. 2 the contact point between link 15 and head 10 does not lie in the middle of link 15, as is the case in Fig. 3. In Fig. 4 the position has again been changed: Angle 16—17, previously almost of 90°, has become very obtuse owing to the transit of link 17 into the vertical position, while angle 16—15 is changed but little. Thus, all links are during their passage around the head 10 led successively through the positions shown. Thereto, however, another circumstance is added, which cannot well be shown, namely that very often on account of the unequal pulling forces on both sides of the chain a short slipping over the head occurs, which is unavoidably connected with angular changes. Finally, the lateral change of direction is added, which occurs during the winding and unwinding of the links (Fig. 5). Of course, the angular changes are the smallest during the position of link on the right side of the head, though the angles remain also here not equal, as they are permanently influenced by the arriving and departing link. A symmetrical position of three links or even one only, which remains equal during the passage of the links around the head, is impossible, because between the arriving and departing link (Figs. 2 and 4) three others only are on the head (in Fig. 3, certainly, four are shown thereon, but this is the case for a moment only, as link 17 is instantaneously removed from the head.) The two outer ones of these three links are permanently under the influence of the two changing pulling forces. Thus, the improved process allows a continuous, quiet and entirely shockless alteration of the position of the chain links relatively to each other during their passage around the head 10. Said alteration need not be very large; it happens, however, owing to the rotation of the head, quickly enough to exclude a condition of inertness even for the fraction of a second. Practical experiments have proved this to its full extent. By trials, the right proportion between length of link and diameter of head, as well as the circumferential speed corresponding to the cooling time of the solder can be easily found; soldering is then effected in a faultless way without the solder overflowing on the outer surfaces of the link or the joint being defectively soldered out.

I claim:

A process of preventing the stiff soldering of chain links entangled for a continuous soldering, consisting in uniformly moving the chain links in downward direction, heating them to the melting temperature of the solder, maintaining them in a helical shock-free movement until the solder has hardened, thereby continuously changing the position of the entangled single chain links relatively to each other and at the same time preventing, owing to the shock-free movement, the solder from running out of the joints to be soldered, substantially as and for the purpose set forth.

In testimony whereof I have hereunto set my hand in the presence of two subscribing witnesses.

LOUIS FRIEDRICH BRITSCH.

Witnesses:
S. H. SHANK,
JOSEPH HEIFFER.